United States Patent Office 3,145,107
Patented Aug. 18, 1964

3,145,107
SHORTENING PRODUCT
Norman Bratton Howard, Hamilton, Ohio, assignor to
The Procter & Gamble Company, Cincinnati, Ohio, a
corporation of Ohio
No Drawing. Filed May 4, 1961, Ser. No. 107,631
10 Claims. (Cl. 99—118)

This invention relates to new and improved shortenings. More particularly, it relates to glyceride fat compositions having superior baking qualities as compared with those which have been previously known.

Ordinary cake baking has customarily been a time consuming and complicated job. Preparing the batter has ordinarily involved a number of mixing steps in which the various ingredients are incorporated into a batter according to involved instructions contained in a recipe. In the most common methods of cake baking, sugar and fat are creamed together, and then the additional ingredients are added in an order that may involve either many separate mixing steps or adding ingredients in a specified order while mixing. It has not been possible, prior to this invention, to simply mix all of the ingredients from almost any cake recipe together in a single step and bake an acceptable cake.

Dry prepared cake mixes have greatly simplified cake baking operations, but many housewives still prefer to bake their own cakes. Although a housewife simply adds liquid to a dry prepared mix to form a batter, this simplicity of procedure is obtained at the cost of variety. The prepared mixes offer a limited choice of cakes, and it is very difficult to add additional ingredients to a prepared mix without severely affecting the quality of the cake. Therefore, a housewife who prefers to use either a particular recipe or particular ingredients may not choose a prepared mix despite the difficulties associated with preparing a batter from many components.

It has now been found that the addition of certain combinations of emulsifiers and high temperature batter stabilizers to a fatty triglyceride will produce a shortening which can be used in a wide variety of recipes with the result that acceptable cakes can be achieved with single-stage mixing in which all the ingredients are added to the mixing bowl at the same time. The cakes prepared with these shortenings by this single-stage mixing are not only superior to cakes prepared with conventional shortenings by single-stage mixing, but are often superior to cakes made with conventional shortenings by conventional procedures.

Accordingly it is an object of this invention to provide a shortening which has improved cake-baking properties over prior art shortenings.

It is a further object to provide a shortening which can be used to prepare a cake batter with only a single mixing step.

Other objects and advantageous features will be apparent from the following detailed description.

In general, shortenings of this invention comprise a fatty triglyceride having a liquid oil phase. From about 1% to about 8%, by weight of the total shortening, of the condensation product of either glycolic or lactic acid with a mixture of mono- and diglycerides is dissolved in the liquid phase to act as an emulsifier. The mono- or diglycerides in the condensation product contain saturated fatty acid radicals containing 14 to 22 carbon atoms. The reactions to form the condensation product are on the basis of about a mole of glycolic or lactic acid with a mole of mono- and diglycerides mixed in ratios of from about 1:9 to about 9:1. Mixtures of emulsifiers can be used.

The fatty triglyceride also contains from about 0.25% to about 4% by weight of the total shortening of material selected from the following high temperature batter stabilizers: (1) saturated fatty acids containing from 14 to 22 carbon atoms; (2) the condensation product of either a fatty acid monoglyceride, a fatty acid diglyceride, a mixture of partial fatty acid glycerides, or a monoester of a straight chain aliphatic diol with a saturated fatty acid having from 14 to 22 carbon atoms with a polycarboxylic acid which has from zero to four hydroxy groups, said condensation product having at least one free carboxyl group per molecule (the polycarboxylic acid can contain from three to six carbon atoms, the diols contain from three to six carbon atoms, the fatty acid radicals in the glycerides are acyl chains containing from 14 to 22 carbon atoms, and the condensation products containing said glycerides can have an Iodine Value not higher than 60); (3) the condensation product of a saturated fatty acid containing from 14 to 22 carbon atoms with a polycarboxylic acid having from one to four hydroxy groups, said condensation product having at least one free carboxyl group per molecule (the polycarboxylic acid can contain from three to six carbon atoms); and (4) the condensation product of a saturated straight chain fatty alcohol containing from 14 to 22 carbon atoms with a dicarboxylic acid having no hydroxy groups and containing from three to six carbon atoms, said condensation product having at least one free carboxyl group per molecule.

As will subsequently be seen from the examples, some variation in both directions from the stated limits is possible or even desirable in certain cases and under certain conditions and the term "about" is used herein to allow for such variations.

As used herein, the term "condensation product" is intended to cover the reaction product in which ester groups form as a result of the reaction of the recited components. These condensation products can be made in various ways. For instance, the condensation product of a monoglyceride with a polycarboxylic acid could be made by reacting glycerine, a fatty acid, and the polycarboxylic acid as well as by reacting the monoglyceride and the polycarboxylic acid. In such reactions the ratios of the materials and the conditions are chosen so that the end product will contain the specific ester desired, but there will also be various other compounds produced. It is not intended that this invention should be limited to a particular method of preparation of any material.

In order to conveniently describe the invention in detail it is necessary to arbitrarily divide the cake baking process into two separate parts. In the first part which comprises the mixing step, one of the major problems concerns the incorporation of air into the batter in the form of small bubbles. The incorporation of air is essentially the production of a foam, and the presence of an oily or fatty phase tends to harm the foam building tendency of the protein fraction of the cake. Although it is not desired to be bound by theory, it is felt that the emulsifiers prevent the oily phase from acting as a foam depressant by forming a film at the oil-aqueous phase interface. It is felt that this property of film formation is related to the oil-aqueous phase interfacial tension since a film is formed at that concentration of emulsifier where an addition of emulsifier ceases to decrease the apparent interfacial tension and begins to increase the apparent interfacial tension. (Interfacial tension measurements were made with a du Nouy tensiometer for this invention.) This concentration varies with temperature as well as composition of the oily phase for any given emulsifier. As temperature increases the minimum concentration also increases.

Since the effectiveness of the emulsifier depends upon its being dissolved in the liquid oily phase, the upper limit of effective concentration is determined by the solubility of the emulsifier in the liquid oily phase. This requirement that the emulsifier be dissolved in the liquid oily phase means that processing of the shortening may require an elevation of temperature and/or prolonged holding times to dissolve the additives.

Again, although it is not desired to be bound by theory, the film forming tendency of the emulsifier is apparently related, at least in part, to the crystalline structure of the emulsifier at the temperature of mixing. The preferred structure is the $\alpha$-phase structure which is ordinarily unstable in relation to the $\beta$ or $\beta'$-phase structure. These crystalline phases are described in U.S. Patents 2,521,242 and 2,521,243, issued September 5, 1950. While not all materials having an $\alpha$-phase structure are effective, it has been noted that certain materials which enhance the $\alpha$ tendencies of certain emulsifiers also increase the effectiveness of those same emulsifiers in increasing air incorporation in the mixing step.

In connection with these emulsifiers, it has been discovered that a combination of the lactic acid-mono-diglyceride condensation product with monoglyceride citrate is considerably more effective when a small percentage of mono-and diglycerides of rapeseed oil hydrogenated to an Iodine Value of 8 is added to the shortening. This has been noted particularly in connection with a plastic glyceride shortening composition. Approximately five percent of the emulsifier, one percent of the high temperature batter stabilizer and one and a half percent of the rapeseed oil mono- and diglycerides is considered to be preferred.

The emulsifiers of this invention can be prepared by interesterifying lactic or glycolic acid and mono- and diglycerides under partial vacuum and elevated temperatures of approximately 300° F. They may also be prepared by reacting glycerine, fatty acid, and lactic or glycolic acid. An example of a method of preparation is U.S. Patent 2,690,971. Although specific methods of preparation have been mentioned, this should not be taken as limiting the invention.

The second part of the cake baking process involves the actual baking. A major problem in this stage is the retention of gas in the cake in the form of small bubbles until the cake is baked. A second problem is the minimization of shrinkage during and subsequent to baking the cake. These problems can be overcome by the use of one or more high temperature batter stabilizers. Without both emulsifier and high temperature batter stabilizer, the complete baking process cannot be accomplished with single-stage mixing of the batter ingredients.

Four general classes of high temperature batter stabilizers have been heretofore described. Specific materials in these classes include: Myristic acid; palmitic acid; stearic acid; arachidic acid; behenic aid; mixtures of the preceding named fatty acids whether derived from animal, vegetable or marine sources; the condensation product of either malic, tartaric, citric, citramalic, trihydroxy glutaric, mucic, saccharic, or mannosaccharic acid with any preceding named fatty acids; the condensation product of either malic, tartaric, citric, citramalic, trihydroxy glutaric, mucic, saccharic, mannosaccharic, malonic, succinic, glutaric, methyl succinnic, dimethyl succinnic, adipic, tricarballylic, maleic, fumaric, itaconic, mesaconic, citraconic, or actonitric acid either (a) a monoglyceride, a diglyceride, or a mixture of mono- and diglycerides containing fatty acid radicals of the preceding named fatty acids, and, if desired, unsaturated straight chain fatty acid radicals having from 14 to 22 carbon atoms in sufficient quantities to raise the Iodine Value of the condensation product not higher than 60, or (b) a monoester of either propylene glycol, 1,3-propanediol, 1,4-butanediol, 1,3-butanediol, or 1,5-pentanediol with any of the preceding named fatty acids; and the condensation product of either succinic, methyl succinic, dimethyl succinic, glutaric, malonic, adipic, maleic, or fumaric acids with saturated straight chain fatty alcohols containing from 14 to 22 carbon atoms, all of the preceding condensation products being characterized by having at least one free carboxyl group per molecule.

Mixtures of these and other compounds within the scope of the claims can also be used. Examples of these mixtures include mixtures of stearic acid and malic palmitate; stearic acid and a condensation product of citric acid and a monoglyceride containing a fatty acid radical of from 14 to 22 carbon atoms; malic palmitate and a condensation product of citric acnd and a monoglyceride containing a fatty acid radical of from 14 to 22 carbon atoms, and malic stearate and tartaric distearate.

This condensation product of citric acid and a monoglyceride containing a fatty acid radical of from 14 to 22 carbon atoms, hereinafter will be referred to as citric acid monoglyceride. The term "monoglyceride" is intended to include materials containing as little as one half monoglyceride with the rest being primarily diglyceride and only a trace of triglyceride. The citric acid monoglycerides can contain mixtures of fatty acid radicals and can be derived from naturally occurring glyceridic materials.

It has been noticed that citric acid monoglyceride may cause shrinkage of the completed baked cake at high levels, but when used in lesser amounts, it is effective. However, since citric acid monoglyceride is effective in producing a finer grain, it is very useful as a component of a mixture of high temperature stabilizers.

The stabilizers hereinbefore described can be prepared as follows:

(1) The fatty acids which function as high temperature batter stabilizers can be readily obtained from hydrogenated glycerides by saponification, acidulation, and isolation procedures. The fatty acid desired determines the choice of glyceridic material. For example, hydrogenated soybean oil would yield a concentrate of stearic acid and hydrogenated rapeseed oil would yield a concentrate of behenic acid.

(2) The second group of high temperature batter stabilizers can be prepared by esterifying polycarboxylic or polycarboxylic hydroxy acids with mono- and diglycerides, and/or monofatty acid esters of diols by direct esterification. This reaction is advantageously carried out in a mutual solvent such as dimethylformamide, dimethylacetamide, dioxane, xylene, and toluene either with or without the use of a catalyst such as sulfuric acid, p-toluene sulfonic acid, hydrogen chloride, zinc chloride, and other such catalysts. The preparations are best carried out with reaction temperatures in the range of from about 75° C. to about 175° C. with water being removed by evolution under reduced pressure or by azeotropic distillation. The stabilizers are isolated by appropriate distillation, and/or washing, and/or crystallization treatments when required to remove solvents, excess reactants, and impurities. It is essential to the functioning of these stabilizers that the reaction products contain a substantial number of molecules containing one or more unesterified carboxyl groups per molecule.

The polycarboxylic acids employed in the above reactions can be used in the form of their anhydrides or acid chlorides when these are available. The reaction conditions necessary for using the anhydrides or acid chlorides will hereinafter be described more fully in connection with the third group of stabilizers.

(3) The third group of high temperature batter stabilizers can be prepared by acylating the polycarboxylic hydroxy acids with fatty acid chlorides by reaction in appropriate solvents such as pyridine, quinoline, dioxane, dimethylformamide, dimethylacetamide, and mixtures thereof, either with or without addition of lipid solvents such as chloroform, benzene, and ethyl ether. These reactions, and the reactions hereinbefore mentioned in connection with the second group of high temperature batter stabilizers, can be carried out over a wide temperature range of from about 0° C. to about 150° C. or higher as long as undesirable side reactions are avoided. Upon completion of the acylation reaction, the stabilizers are isolated by dilution with an aqueous phase followed by washing, and/or distillation, and/or crystallization when required to remove solvents, excess reactants, and impurities. The method of U.S. Patent 2,251,695, Tucker, is an effective example of such a procedure.

(4) The fourth group of high temperature stabilizers can be prepared by the same procedures used to prepare the second group, using the appropriate fatty alcohols.

Again, although specific examples of methods of preparation have been given, this is not intended to limit the scope of this invention to a particular method of preparation.

Combinations of high temperature batter stabilizers may give better results than a single high temperature batter stabilizer. For example, with respect to volume, mixtures of citric acid monoglyceride and stearic acid in a ratio of from about one to seven to about three to five give the best results. Other mixtures can also be used.

It will be understood that some combinations of high temperature batter stabilizers and emulsifiers are more advantageous than others. For example, many of the additives may have adverse effects on particular properties such as smoke point and clarity and pourability of a liquid oil. It is to be understood that a balancing of factors may be indicated.

Combinations which have been found to be effective include a mixture of the condensation product of lactic acid and a mixture of mono- and diglycerides and either citric acid monoglyceride, malic stearate, or a mixture of citric acid monoglyceride and stearic acid.

When the additives of this invention are used in a shortening, the presence of other additives such as conventional monoglyceride emulsifiers is not precluded, since conventional benefits may still be derived by their use. It will be recognized, of course, that the presence of other additives may have an effect on the operation of the additives of this invention and therefore, the desirability of their use will depend upon the results desired.

Any fatty triglyceride material is suitable for use in shortenings of this invention so long as it has a liquid phase and has no qualities which would make it harmful to the health or esthetically undesirable. As far as physical properties are concerned, the material can be entirely liquid at room temperature like salad oils or the material can be a suspension of solids in a liquid such as is described in U.S. Patents 2,521,219 and 2,521,242, issued September 5, 1950, and U.S. Patents 2,815,285 and 2,815,286, issued December 3, 1957. The material can also contain sufficient solids to form a plastic shortening in which the liquid phase is trapped within a matrix of fat crystals in such a manner that no liquid phase is evident.

The chemical constituents of the fatty triglycerides can also vary widely. For example, the triglycerides can be of animal, vegetable, or marine origin. If desired the triglycerides can be unhydrogenated or they can be hydrogenated to some degree to improve their keeping properties or other properties desirable for a shortening. Other permissible variations include mixing different fatty triglycerides or interesterifying mixtures of fatty triglycerides to give a random distribution of the triglycerides. Low temperature interesterification can be used to form a maximum amount of trisaturates and triunsaturates. An example of a suitable mixture is the addition of a high-melting triglyceride to an oil to form either a plastic shortening or a suspension. Although specific types of triglycerides have been mentioned, this should not be taken as limiting this invention to any specific fatty triglyceride materials.

All types of layer cakes can be made with the products of this invention. White cakes, yellow cakes, chocolate cakes, and many others can be prepared by simply mixing the shortenings of this invention with the other ingredients of the cake in a single mixing step. Therefore, simplification is not at the expense of variety. One of the unique advantages of this invention is that regardless of the ingredients or the detailed instructions for mixing which a recipe contains, substituting the shortenings of this invention for prior art shortenings enables one to combine the ingredients of the recipe in a single mixing step. Simply adding all of the ingredients to a mixing bowl and then mixing is all that is required. Although specific types of cakes have been mentioned, this should in no way be held to limit this invention to the preparation of any specific cake.

The shortenings of this invention also tend to equalize the variations in baking performance which are usually obtained with various kinds of cake flour, thus permitting the use of a wide range of flours than has been heretofore possible with prior art baking shortenings.

The following examples are illustrative of the practice of the instant invention and show the superior results that can be obtained with the instant invention.

In all of the examples, the additives were dissolved in the shortening material, although this should not be taken as limiting the invention in any way.

The term "critic acid monoglyceride I" as used in the following examples refers to condensation product of citiric acid with a "monoglyceride" containing fatty acids having from 14 to 22 carbon atoms. Unless otherwise described, the specific material used was a commercial product "Seqol 130." The fatty acids present in this product are 2.1% myristic, 50.3% palmitic, 44.4% stearic acid, 3.3% palmitoleic based upon an analysis of the product. "Seqol 140," also described by its manufacturer as stearyl monoglyceridyl citrate, will be listed by its trade name. It is a condensation product reported to be similar to "Seqol 130" except that the acids comprises about 28% stearic, 25% oleic, and 47% linoleic, which gives the finished product an Iodine Value of about 43.7. Another similar material, manufactured by a different company is referred to by the name "critic acid monoglyceride II". It had an Iodine Value of about 57.79. Although the products are referred to a citric acid monoglycerides, they actually are the reaction product of citric acid and a mixture of partial glycerides containing as much as half diglycerides.

The term "lactic acid ester" as used in the following examples refers to a condensation product containing esters of lactic acid and fatty acid with glycerine in which the fatty acid was approximately one-half palmitic acid and the other one-half was stearic acid. Based on a series of analyses the composition was approximately 4.5% fatty acid triglyceride; 22.7% fatty acid diglyceride; 4.9% fatty acid monoglyceride; 23.6% monolactyl, di-fatty acid glyceride; 36.4% monolactyl, mono-fatty acid glyceride; 4.2% free lactic acid; 3.7% lactyl glycerides; and a trace of free fatty acid.

The following basic white cake recipe was used in obtaining the data contained in the following Tables I and II.

| | G. |
|---|---|
| Granulated sugar | 267.0 |
| Cake flour | 214.0 |
| Double-acting baking powder | 13.3 |
| Salt | 5.0 |
| Shortening | 95.0 |
| Milk | 260.0 |
| Egg whites | 120.0 |

All of the above ingredients were placed in a standard household mixer. The mixer was run at slow speed for about 15 seconds until the dry ingredients were wet and then turned to top speed. The batter was mixed at top speed for one minute and 45 seconds, scraping the bowl as in normal mixing, and then the speed was lowered and the batter was mixed for one additional minute. The specific gravity of the batter was then measured. A 400 g. sample of the batter was poured into an eight inch cake pan and baked at 375° F. for about 27 minutes or until the cake sprang back after being touched or pulled away from the sides of the pan. Thirty seconds after the cakes were removed, the center and edge heights were measured. The cakes were cooled and again the center and edge heights were measured. The cake was next cut in half and the layer was evaluated for fineness of grain, structure, presence of holes or tunnels, and color.

The following table contains the results of observations made in the preparation of cakes prepared with the shortenings of this invention.

Table I

The cakes in this table were made from batters comprising a plastic shortening. This plastic shortening comprised a plastic shortening base which was a mixture of 85% by weight refined and bleached soybean oil and 15% by weight refined and bleached cottonseed oil which had been hydrogenated as a mixture to an Iodine Value of about 80. With the exception of the first example, the plastic shortening contained 5% by weight of the shortening of lactic acid ester and 1½% by weight of the shortening of the mono-diglycerides of rapeseed oil hydrogenated to an Iodine Value (IV) of 8.

The shortening was prepared by dissolving the additives in the shortening base by heating to not higher than 180° F. The mixture was then chilled with aeration in a three quart mixing bowl immersed in a Dry Ice-alcohol bath. The mix was poured into the bowl slowly while whipping it or beating and then was allowed to sit overnight. All acid monoglycerides in this table are condensation products of the named acid with a fatty acid "monoglyceride" wherein the fatty acid has the indicated number of carbon atoms.

| Example No. | High temperature batter stabilizer | Percent high temperature batter stabilizer | Batter density | Cake height (in.) Hot Center | Hot Edge | Cold Center | Cold Edge | Grain | Texture | Comments |
|---|---|---|---|---|---|---|---|---|---|---|
| 1 | | | 1.02 | 1.65 | 1.26 | 1.42 | 1.22 | Moderately poor. | Poor | Flat profile, irregular crust. |
| 2 | | | 0.79 | 1.40 | 1.30 | 1.10 | 0.90 | Very poor | Very poor | Bad dip in center. |
| 3 | Citric acid monoglyceride I. | 1.0 | 0.76 | 2.05 | 1.82 | 1.70 | 1.45 | Fine | Excellent, uniform. | Bold profile. |
| 4 | do | 2.0 | 0.72 | 2.05 | 1.48 | 1.70 | 1.35 | do | do | Do. |
| 5 | do | 0.5 | 0.76 | 2.05 | 1.55 | 1.72 | 1.47 | | | |
| 6 | Succinic acid monoglyceride (C₁₆-C₁₈). | 0.5 | 0.76 | 2.05 | 1.47 | 1.82 | 1.40 | Slightly coarser. | Excellent | Excellent. |
| 7 | do | 1.0 | 0.74 | 1.86 | 1.45 | 1.67 | 1.38 | | | |
| 8 | Malonic acid monoglyceride (C₁₆-C₁₈). | 0.5 | 0.77 | 1.87 | 1.42 | 1.70 | 1.30 | Slightly coarser. | Excellent | Excellent. |
| 9 | do | 1.0 | 0.74 | 1.90 | 1.45 | 1.70 | 1.40 | do | do | Do. |
| 10 | Citric acid monoglyceride II. | 0.5 | 0.74 | 2.16 | 1.52 | 1.92 | 1.42 | | | |
| 11 | do | 1.0 | 0.81 | 2.12 | 1.60 | 1.86 | 1.46 | | | |

Table II

The cakes in this table were made with the plastic shortening base of Table I, containing varying amounts of the indicated additives. The lactic acid ester in Examples 16 through 18 was agitated with a 10% NaCl solution for one-half hour at 160° F., cooled to allow the fatty phase to solidify, and then heated without agitation. The fatty phase was decanted, cooled, dried, and used in the shortening.

| Example No. | High temperature batter stabilizer | Percent high temperature batter stabilizer | Batter density | Cake height (ins.) Hot Center | Hot Edge | Cold Center | Cold Edge | Percent lactic acid ester | Percent mono-diglycerides of rapeseed oil, IV 8 |
|---|---|---|---|---|---|---|---|---|---|
| 12 | Commercial product Seqol 140. | 0.25 | 0.83 | 2.02 | 1.55 | 1.75 | 1.42 | 6 | 3.0 |
| 13 | do | 1.0 | 0.82 | 1.82 | 1.65 | 1.60 | 1.45 | 6 | 0.5 |
| 14 | do | 0.25 | 0.92 | 1.82 | 1.50 | 1.60 | 1.35 | 3 | 3.0 |
| 15 | do | 1.0 | 0.89 | 1.80 | 1.52 | 1.52 | 1.36 | 3 | 3.0 |
| 16 | | | 0.83 | 1.42 | 1.22 | 1.28 | 1.12 | 5 | |
| 17 | Stearic acid | 2.0 | 0.87 | 1.83 | 1.25 | 1.70 | 1.23 | 5 | |
| 18 | do | 2.0 | 0.90 | 1.96 | 1.40 | 1.75 | 1.32 | 5 | 5.0 |

The following basic cake recipe was used in obtaining the data contained in the following tables.

| | G. |
|---|---|
| Flour | 95.0 |
| Shortening | 50.0 |
| Granulated sugar | 133.0 |
| Salt | 1.5 |
| Milk | 120.0 |
| Double-acting baking powder | 5.78 |
| Fresh egg whites | 60.0 |
| Vanilla extract | 2.5 |

The ingredients were mixed for four minutes at 450 revolutions per minute (medium speed) in a conventional household mixer. The batter density was then measured in grams per cubic centimeter. Next, 400 g. of batter was placed in a pan and baked for 25 minutes at 365° F. The baker cakes were removed from the oven and fifteen minutes later, their volume was measured in cubic centimeters.

In the following tables batter densities and volumes have been given. In general, a cake made with cottonseed oil and no additives will give a batter density of approximately 1.15 g./cc. and a volume of approximately 925–950 cc. per 400 g. of batter. A good batter density would be about .9 g./cc. and an increase in cake volume of about 100 cc. is considered a significant improvement.

*Tables III and IV*

The following cakes contained lactic acid ester as the emulsifier and refined and bleached cottonseed oil shortening.

*Table III*

| Example No. | Percent emulsifier | Percent citric acid monoglyceride | Percent stearic acid | Batter density, g./ml. | Cake volume, c.c. |
|---|---|---|---|---|---|
| 19 | 6.0 | 0 | 2 | 0.78 | 950 |
| 20 | 6.0 | 0.10 | 1.90 | 0.73 | 1,040 |
| 21 | 6.0 | 0.20 | 1.80 | 0.71 | 1,225 |
| 22 | 6.0 | 0.25 | 1.75 | 0.80 | 1,300 |
| 23 | 6.0 | 0.50 | 1.50 | 0.80 | 1,300 |
| 24 | 6.0 | 0.75 | 1.25 | 0.83 | 1,285 |
| 25 | 6.0 | 1.0 | 1.0 | 0.80 | 1,225 |
| 26 | 6.0 | 2.0 | | 0.80 | 1,205 |

*Table IV*

| Example No. | Percent emulsifier | Percent malic palmitate | Percent stearic acid | Batter density, g./ml. | Cake volume, c.c. |
|---|---|---|---|---|---|
| 27 | 6.0 | 0.25 | 2.0 | 0.78 | 1,040 |
| 28 | 6.0 | 0.25 | 1.75 | 0.83 | 950 |
| 29 | 6.0 | 0.5 | 1.50 | 0.85 | 950 |
| 30 | 6.0 | 0.75 | 1.25 | 0.83 | 985 |
| 31 | 6.0 | 1.0 | 1.0 | 0.81 | 1,020 |
| 32 | 6.0 | 2.0 | | 0.85 | 1,115 |

*Table V*

The following cakes were prepared with refined and bleached cottonseed oil shortening containing 6% by weight of lactic acid ester and various amounts of the indicated high temperature batter stabilizers.

| Example No. | High temperature batter stabilizer | Percent high temperature batter stabilizer | Batter density, g./c.c. | Cake volume, c.c. |
|---|---|---|---|---|
| 33 | Malic stearate | 0.1 | 0.73 | 875 |
| 34 | do | 0.25 | 0.71 | 895 |
| 35 | do | 0.50 | 0.79 | 1,025 |
| 36 | do | 1.0 | 0.83 | 1,075 |
| 37 | do | 2.0 | 0.90 | 1,225 |
| 38 | Malic palmitate | 2.0 | 0.85 | 1,115 |

*Table VI*

The following cakes were prepared with refined and bleached cottonseed oil shortening containing lactic acid ester as the emulsifier and the indicated amounts of high temperature stabilizers.

| Example No. | Percent emulsifier | High temperature batter stabilizer | Percent stabilizer | Batter Density g./c.c. | Cake volume, c.c. | Remarks |
|---|---|---|---|---|---|---|
| 39 | 2.0 | Monostearoyl propylene gylcol hydrogen succinate. | 0.5 | 0.89 | 1,185 | Coarse grain. |
| 40 | 2.0 | do | 1.0 | 0.93 | 1,115 | Do. |
| 41 | 2.5 | do | 0.5 | 0.79 | 1,185 | Do. |
| 42 | 2.5 | do | 0.75 | 0.85 | 1,170 | Do. |
| 43 | 2.75 | do | 0.5 | 0.76 | 1,130 | Do. |
| 44 | 3.0 | do | 0.5 | 0.61 | 1,040 | Do. |
| 45 | 4.0 | do | 0.5 | 0.60 | 1,040 | Dipped in center. |
| 46 | 4.0 | do | 2.0 | 0.62 | 1,005 | Slight dip in center. |
| 47 | 5.0 | do | 0.5 | 0.58 | 965 | Dipped in center; shrank in oven. |
| 48 | 8.0 | Octadecyl hydrogen succinate. | 0.5 | 0.58 | 1,025 | |
| 49 | 8.0 | do | 0.75 | 0.59 | 930 | |
| 50 | 8.0 | do | 1.00 | 0.59 | 985 | |

*Table VII*

The following cakes were prepared with refined and bleached cottonseed oil shortening containing 3% of lactic acid ester as the emulsifier and 3% of monostearoyl propylene glycol hydrogen succinate together with the indicated amounts of stearic acid.

| Example No. | Percent Stearic acid | Batter density g./c.c. | Cake volume, c.c. | Remarks |
|---|---|---|---|---|
| 51 | 0.5 | 0.61 | 1,250 | |
| 52 | 1.0 | 0.65 | 1,060 | Dipped in center. |
| 53 | 1.5 | 0.71 | 1,040 | |

All percentages of additives in the preceding tables were by weight of the total shortening. In Tables III through VII the shortening is referred to as cottonseed oil shortening. This means that the triglyceride base oil for the shortening was cottonseed oil. Although the data in the preceding tables indicates the performance of shortenings of this invention in white cakes, similar good results can be achieved in other types of cakes such as chocolate and spice, by the use of appropriate formulations well known to those skilled in the art. Likewise the incorporation of the additives in oils which contain higher melting glyceride materials so as to form pourable suspensions or plastic shortenings will also result in improved performance.

Although specific fatty triglyceride base oils were used in preparing the shortenings for the preceding examples, other fatty triglyceride materials having a liquid oily phase such as peanut oil, linseed oil, sunflower seed oil, corn oil, olive oil, rapeseed oil, fish oil and the like or normally liquid fractions obtained from triglyceride oils can be substituted with equivalent results.

The preceding examples are illustrative of the invention and are not to be taken as in any limiting the scope of this invention.

However, as can be seen from the examples, the presence of either emulsifier or high temperature batter stabilizer alone is insufficient to enable one to prepare satisfactory cakes by single-stage mixing. A combination of the two generally within the previously stated limits, however, gives exceptional results.

What is claimed is:

1. A glyceride shortening composition which can be used in the preparation of recipe cake batters with single-stage mixing containing as additives from about 1% to about 8%, by weight, of the condensation product of a material selected from the group consisting of glycolic acid and lactic acid with a mixture of fatty acid mono- and diglycerides in ratios of from about 1:9 to about 9:1, said fatty acid mono- and diglycerides having fatty acid radicals containing from 14 to 22 carbon atoms, and from about 0.25% to about 4% by weight of material selected from the group consisting of (1) saturated fatty acids containing from 14 to 22 carbon atoms; (2) the condensation product of material selected from the group consisting of (a) a partial fatty acid glyceride containing an average of from one to two fatty acid radicals having from 14 to 22 carbon atoms, but not more than enough unsaturated fatty acid radicals to give a condensation product having an Iodine Value of 60, and (b) a monoester of a straight chain aliphatic diol with a saturated fatty acid, said diol containing from three to five carbon atoms and said saturated fatty acid containing from 14 to 22 carbon atoms with a polycarboxylic acid having from zero to four hydroxy groups, said polycarboxylic acid containing from three to six carbon atoms and said condensation product having at least one free carboxyl group per molecule; (3) the condensation product of a saturated fatty acid containing from 14 to 22 carbon atoms with a polycarboxylic acid having from one to four hydroxy groups, said polycarboxylic acid cotnaining from three to six carbon atoms and said condensation product having at least one free carboxyl group per molecule; (4) the condensation product of a saturated straight chain fatty alcohol containing from 14 to 22 carbon atoms with a dicarboxylic acid having no hydroxy groups and containing from 3 to 6 carbon atoms, said condensation product having at least one free carboxyl group per molecule; and (5) mixtures of the preceding materials.

2. The product of claim 1 in which the triglyceride base oil for the shortening composition is cottonseed oil and the additives are the condensation product of lactic acid with a mixture of monoglycerides and diglycerides in ratios of from 1:9 to 9:1 and citric acid monoglyceride.

3. The product of claim 1 in which the additives are the condensation product of lactic acid and a mixture of mono- and diglycerides in ratios of from about 1:9 to 9:1 and a mixture of citric acid monoglyceride and stearic acid.

4. The process of preparing a shortening which can be used in the preparation of recipe cake batters with single-stage mixing, which comprises dissolving into a glyceride shortening composition as additives, from about 1% to about 8% by weight of the condensation product of material selected from the group consisting of glycolic and lactic acid with material selected from the group consisting of a mixture of fatty acid mono- and diglycerides having fatty acid radicals containing from 14 to 22 carbon atoms, and from about 0.25% to about 4% by weight of a material selected from the group consisting of (1) saturated fatty acids containing from 14 to 22 carbon atoms; (2) the condensation product material selected from the group consisting of (a) a partial fatty acid glyceride containing an average of from one to two fatty acid radicals having from 14 to 22 carbon atoms, but not more than enough unsaturated fatty acid radicals to give a condensation product having an Iodine Value of 60 and (b) a monoester of a straight chain aliphatic diol with a saturated fatty acid, said diol containing from three to five carbon atoms and said saturated fatty acid containing from 14 to 22 carbon atoms with a polycarboxylic acid having from zero to four hydroxy groups, said polycarboxylic acid containing from three to six carbon atoms and said condensation product having at least one free carboxyl group per molecule; (3) the condensation product of a saturated fatty acid containing from 14 to 22 carbon atoms with a polycarboxylic acid having from one to four hydroxy groups, said polycarboxylic acid containing from three to six carbon atoms and said condensation product having at least one free carboxyl group per molecule; (4) the condensation product of a saturated straight chain fatty alcohol containing from 14 to 22 carbon atoms with a dicarboxylic acid having no hydroxy groups and containing from 3 to 6 carbon atoms, said condensation product having at least one free carboxyl group per molecule; and (5) mixtures of the preceding materials.

5. The process according to claim 4 in which the additives are the condensation product of lactic acid with a mixture of monoglycerides and diglycerides in ratios of from 1:9 to 9:1 and citric acid monoglyceride.

6. The process according to claim 4 in which the additives are the condensation product of lactic acid with a mixture of mono- and diglycerides in ratios of from 1:9 to 9:1 and a mixture of citric acid monoglyceride and stearic acid.

7. A plastic glyceride shortening composition which can be used in single-stage batter mixing containing an additives about 5%, by weight, of the condensation product of lactic acid with a mixture of monoglycerides and diglycerides in ratios of from 1:9 to 9:1; about 1½%, by weight, of hydrogenated mono- and diglycerides of rapeseed oil with an Iodine Value of about 8; and about 1%, by weight, of citric acid monoglyceride.

8. The process of preparing a shortening which can be used in single-stage batter mixing, which comprises dissolving into a glyceride shortening composition as additives, from about 1% to about 8% by weight of the condensation product of lactic acid with a mixture of mono- and diglycerides in ratios of from 1:9 to 9:1; a mixture of mono- and diglycerides of rapseed oil hydrogenated to an Iodine Value of about 8; and from about 0.25% to about 4% by weight of citric acid monoglyceride.

9. A glyceride shortening composition which can be used in the preparation of recipe cake batters which single-stage mixing containing as additives from about 1% to about 8%, by weight, of the condensation product of lactic acid and a mixture of fatty acid mono- and diglycerides in ratios of from about 1:9 to about 9:1, said fatty acid mono- and diglycerides having fatty acid radicals containing from 14 to 22 carbon atoms, and from about 0.25% to about 4%, by weight, of malic stearate.

10. The process of preparing a shortening which can be used in the preparation of recipe cake batters with single-stage mixing, which comprises dissolving into a glyceride shortening composition as additives, from about 1% to about 8%, by weight, of the condensation product of lactic acid and a mixture of fatty acid mono- and diglycerides in ratios of from about 1:9 to about 9:1, said fatty acid mono- diglycerides having fatty acid radicals containing from 14 to 22 carbon atoms, and from about 0.25% to about 4%, by weight, of malic stearate.

References Cited in the file of this patent

UNITED STATES PATENTS

| | | |
|---|---|---|
| 2,061,122 | Coith et al. | Nov. 17, 1936 |
| 2,690,971 | Iveson et al. | Oct. 5, 1954 |
| 2,813,032 | Hall | Nov. 12, 1957 |
| 2,868,652 | Brock | Jan. 13, 1959 |
| 3,011,896 | Eber et al. | Dec. 5, 1961 |
| 3,029,147 | Radlove | Apr. 10, 1962 |

UNITED STATES PATENT OFFICE
CERTIFICATE OF CORRECTION

Patent No. 3,145,107                        August 18, 1964

Norman Bratton Howard

It is hereby certified that error appears in the above numbered patent requiring correction and that the said Letters Patent should read as corrected below.

Column 1, line 16, for "a" read -- the --; column 4, line 3, for "actonitric acid either" read -- actonitic acid with either --; column 6, line 33, for "wide" read -- wider --; line 41, for "critic" read -- citric --; line 43, for "citiric" read -- citric --; lines 53 and 54, for "comprises" read -- comprise --; line 57, for "critric" read -- citric --; same column 6, line 59, for "a" read -- as --; column 8, line 73, for "baker" read -- baked --; column 9, Table III, in the heading to column 3 thereof, after "monoglyceride" insert -- I --; same column 9, Table VI, third column, line 2 thereof, for "gylcol" read -- glycol --; column 11, line 16, for "cotnaining" read -- containing --; column 12, line 19, for "an" read -- as --; line 33, for "rapseed" read -- rapeseed --; line 37, for "which" read -- with --; same column 12, line 52, for "mono- diglycerides" read -- mono- and diglycerides --.

Signed and sealed this 27th day of April 1965.

(SEAL)
Attest:

ERNEST W. SWIDER                      EDWARD J. BRENNER
Attesting Officer                 Commissioner of Patents